United States Patent

[11] 3,586,268

[72] Inventor William W. Melvin
8434 Greenstone Drive, Dallas, Tex. 75231
[21] Appl. No 813,500
[22] Filed Apr. 4, 1969
[45] Patented June 22, 1971

[54] INSTRUMENT FLIGHT SYSTEM
14 Claims, 6 Drawing Figs.
[52] U.S. Cl. ................................................. 244/77A
[51] Int. Cl. ..................................................... B64c 13/16
[50] Field of Search ............................................. 244/77, 77 A, 77 D, 77 B

[56] References Cited
UNITED STATES PATENTS

| | | | |
|---|---|---|---|
| 2,664,254 | 12/1953 | Hendrickson | 244/77 |
| 2,875,965 | 3/1959 | Anderson | 244/77 |
| 3,077,557 | 2/1963 | Joline et al. | 244/77 |
| 3,241,792 | 3/1966 | Hattendorf | 244/77 |
| 3,379,396 | 4/1968 | Patterson | 244/77 |

Primary Examiner—Milton Buchler
Assistant Examiner—James E. Pittenger
Attorney—Robert G. McMorrow ABSTRACT: An aircraft control system particularly useful during approach operations. In the approach mode, a pitch command computer produces a pitch command signal for controlling an aircraft's pitch to maintain a desired angle of attack, and hence a desired airspeed; and a thrust command computer produces a thrust command signal for controlling the flight path angle to maintain an aircraft on a desired glide path for landing. The command signals control either instrument indicators which visually display the appropriate information to the pilot for manual operation or alternatively control an autopilot and autothrottle for automatic operation of the aircraft. If the aircraft is below the desired glide path but at the desired airspeed, a thrust command computer indicates the direction necessary to change the thrust to increase the aircraft's flight path angle so that the aircraft returns to the glide path. As the thrust level is varied according to the thrust command signal, an angle of attack sensor senses the changes in the angle of attack of the aircraft and a pitch command computer produces a pitch command signal to maintain the angle of attack at a desired level determined from the desired airspeed. In addition to the approach mode, the control system offers advantages in the take off, climb, hold, maximum range, severe turbulence, and descent modes of an aircraft's operation. The cruise mode operates similar to prior art systems.

INVENTOR
WILLIAM W. MELVIN

BY Robert G. McMorrow
ATTORNEY

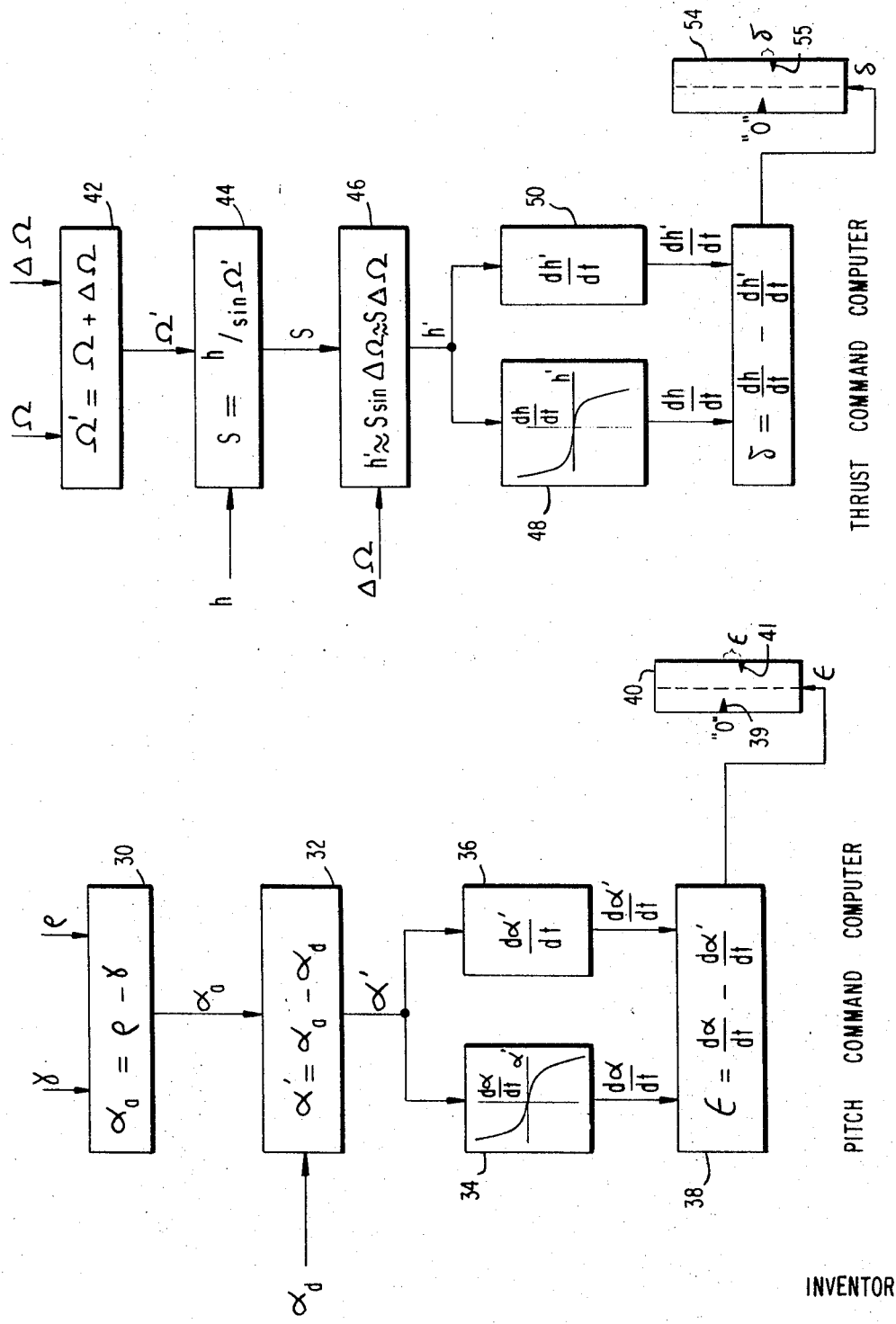

INSTRUMENT FLIGHT SYSTEM

BACKGROUND OF THE INVENTION

1. Field of the Invention

This invention relates to a system for controlling the path of flight of an aircraft and more particularly to a control system in which the thrust is varied to maintain an aircraft on a desired glide path, and the pitch of the aircraft is varied to maintain a desired angle of attack.

2. Description of the Prior Art

In normal flight, an aircraft's motion is controlled by its heading, thrust, and angle of attack. Since airspeed is a direct function of an aircraft's angle of attack, the angle of attack is usually controlled by reference to the aircraft's airspeed. Pitch and thrust, however, have primary and secondary effects upon an aircraft's flight performance. The primary effect of a change in the pitch is that it causes a directly proportional change in the angle of attack because of the relationship between an aircraft's angle of attack, its pitch, and its flight path angle. The secondary effect of a change in pitch is that it causes a change in the thrust requirement to maintain a steady state flight condition. This secondary effect occurs because of the relationship between the angle of attack and the drag. This relationship is generally represented by a thrust versus airspeed curve. Because the required thrust is equal to the aircraft's induced drag, which increases with a decrease in airspeed (increase in angle of attack) and the profile drag which increases with an increase in airspeed (decrease in angle of attack), the curve has a negative slope at low airspeeds but a positive slope at higher airspeeds. Thus, the secondary effect of a pitch change is highly variable and can be either positive or negative depending upon the aircraft's position from the thrust versus airspeed curve. When an aircraft operates at a high airspeed, where the thrust versus airspeed curve has a positive slope, the aircraft has positive speed stability. That is, a decrease in airspeed places the aircraft in a position of having excess thrust for that airspeed and the aircraft will tend to return to the previous airspeed. At low airspeeds, where the slope of the curve changes, the speed stability goes from positive to zero to negative. When an aircraft has negative speed stability, more thrust is required to fly the aircraft at lower airspeeds.

The primary effect of a change in thrust is that it causes a change in the aircraft's flight path angle which is, in turn, dependent upon the relationship between the flight path angle, drag, and thrust. The secondary effect of a change in thrust is that it causes a change in the angle of attack because of the relationship between the angle of attack, flight path angle, and pitch; but this effect is also mutually dependent upon the pitch.

Prior art manual and automatic control systems which use computed command signals for control of the aircraft on approach, use a method of control whereby pitch is used to control the aircraft's position on a glide path with the resultant effect upon the angle of attack being corrected for with thrust corrections. This method is quite useful for cruise flight where strong speed stability exists because it is not desirable to constantly change thrust to maintain an altitude during cruise flight. However, the use of this method during an approach operation has serious faults, since the aircraft is operating low on the thrust versus airspeed curve. By using this method during approach, control is achieved by making changes to the improper control function and a time lag occurs during which the effects of this first correction are observed before the correct control input is made. For example, if an aircraft is going below the glide path, additional thrust is needed to increase the flight path angle, but the prior art systems have instead changed the pitch to cause the aircraft to fly to the glide path. This causes an increase in angle of attack which is indicated by a decrease in the airspeed. This change in angle of attack or airspeed is then noted and a thrust correction is applied which changes the flight path angle, resulting in a change to the angle of attack (depending upon the pitch). When the aircraft returns to the glide path, the pitch is again changed and the thrust is also varied after the results of the pitch change are evident. Thus, there is a time lag which makes it very difficult to control an aircraft when displacements occur rapidly, such as, when the aircraft is very close to the glide path signal source and during rapid wind shears. The control problem increases as speed stability decreases, since the throttle response required to control the aircraft during operation with positive speed stability is not sufficient if the aircraft should be displaced to a negative speed stability position. Also undesirable oscillations occur because of the inertia of the aircraft, since thrust corrections can only occur as airspeed begins to change.

SUMMARY OF THE INVENTION

Accordingly, this invention is an improved flight control system which alleviates the foregoing disadvantages. The system was developed primarily for approach, although it utilized a pitch command signal which allows an aircraft's pitch to be varied during all modes of flight, except the cruise mode, in order to obtain a desired angle of attack for a particular mode of flight. There is also a thrust command signal which is employed in the approach mode. In approach mode, the angle of attack of the aircraft is controlled entirely by pitch command signals, and the position on a glide path is controlled entirely by thrust command signals. The invention therefore implements the principle that the thrust level, rather than the pitch, should be used to correct for glide path displacements, and the pitch should be used to control the angle of attack or airspeed. The actual method employed is first, to reduce the rate of displacement of the aircraft from the glide path to zero by thrust control, and second, by further thrust control to gradually return the aircraft to the glide path. The magnitude of the corrective thrust which must be applied for a given angular displacement from the glide path is proportional to the distance the aircraft is from the touchdown point. The aircraft's angular displacement from the glide path is measured as a function of the angle of deviation from the glide path signal and, thus, linear displacement depends upon the distance the aircraft is from the touchdown point. Corrective thrust for a given angular displacement is, hence, applied at a greater magnitude in terms of pounds when the aircraft is at a greater distance from touchdown. At all times during the thrust corrections, pitch command signals enable the pilot or autopilot to control the aircraft with reference to a desired angle of attack.

It is thus a primary object of this invention to provide an improved aircraft control system which employs thrust level control to correct for glide path displacements and pitch control to maintain a desired angle of attack, or airspeed.

It is a further object to provide a unique thrust level control whereby the rate of displacement of an aircraft from a glide path is first reduced to zero and the aircraft is returned to the glide path by further thrust control at a predetermined, but variable, rate.

Another object is to provide a means to determine an aircraft's angle of attack by measurement of the aircraft's performance.

A further object is to provide a means for determining an aircraft's linear displacement from a desired glide path.

It is an additional object of this invention to provide a unique combination of angle of attack and thrust information which is primarily useful during approach and landing operations, but which has advantages in other modes of operation as well.

BRIEF DESCRIPTION OF THE DRAWINGS

FIG. 5 is a block diagram of a preferred embodiment of the pitch computer.

FIG. 6 is a block diagram of a preferred embodiment of the thrust computer.

DESCRIPTION OF THE PREFERRED EMBODIMENTS

Figure 1:
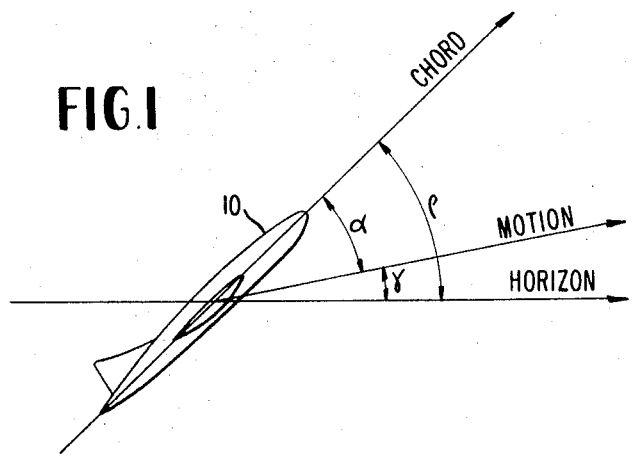
FIG. 1 illustrates the relationship between the pitch, the flight path angle, and the angle of attack of an aircraft.

FIG. 1 illustrates the relationship between the pitch (also called attitude), the flight path angle, and the angle of attack, and presents useful background material for the discussion of this invention. The pitch $\rho$ is defined as the angle between the chord of the wing of the aircraft and the horizon. The flight path angle $\gamma$ is the angle between the aircraft's direction of motion and the horizon. The angle of attack $\alpha$ is defined as the angle between the chord of the wing and the direction of motion of the aircraft. If angles in a counterclockwise direction are assumed to be positive and those in a clockwise direction are assumed to be negative, the following equation expresses the relationship between these three horizon during all conditions of $$\alpha = \rho - \gamma D$$

Figure 2:
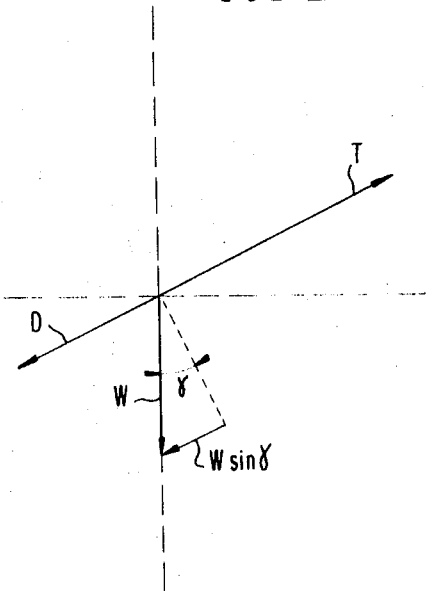
FIG. 2 illustrates the basic relationship between thrust, drag, and flight path angle.

FIG. 2 illustrates the basic forces acting along an aircraft's longitudinal axis in flight, and is used to derive a mathematical formula to establish the flight path angle $\gamma$. It is assumed that all forces are acting through the center of gravity of the aircraft. Vector $T$ represents the thrust developed by the aircraft in a direction parallel to its motion. The vector $D$ represents the drag forces, the vector $W$ represents the weight of the aircraft and angle $\gamma$ is the flight path angle which has been defined above as the angle between the aircraft's direction of motion and the horizon. Summing these vector forces, the following equation is derived:

$T - D - W \sin \gamma = 0$ where the flight path angles above the horizon are positive and those below the horizon are negative, and hence:

$$\sin \gamma = (T - D)/W$$

It is evident from the above equation and the relationship between flight path angle, angle of attack, and pitch that thrust should be used as the primary means to control the flight path angle for steady state climbing or descending flight.

Figure 3:
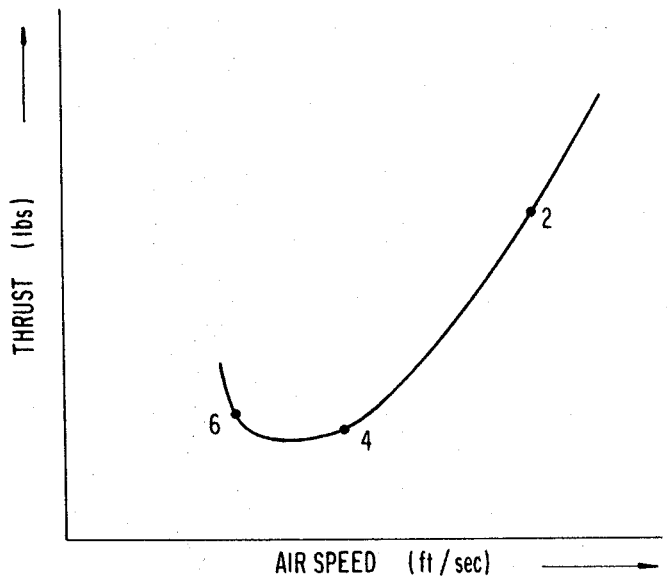
FIG. 3 illustrates a thrust versus airspeed curve which is applicable to all aircraft according to aerodynamic theory.

FIG. 3 is a graph of a thrust versus airspeed curve which is applicable to all aircraft according to aerodynamic theory. The thrust has units of pounds and is plotted on the vertical axis. The airspeed has units of feet per second and is plotted on the horizontal axis. The aircraft in cruise flight is far out on a curve, for example, at point 2. An aircraft operating in this area of the curve has what is commonly referred to as speed stability, since for a decrease in airspeed, there is a proportionate reduction in the required thrust and vice versa. That is, the slope of the curve at point 2 is much greater than the slope at point 4. A suitable method for controlling the flight path of an aircraft operating on this portion of the curve is to maintain altitude by pitch control and to maintain airspeed by thrust control. However, an aircraft in the approach mode must operate near point 4 where the slope of the curve is much less than at point 2, and therefore, the aircraft has less speed stability. Furthermore, because of wind shears, it is possible for an aircraft to be displaced to a negative speed stability condition requiring an increase in thrust for a decrease in airspeed, for example, at point 6. Therefore, the method of employing thrust to vary airspeed is a useful method only when the aircraft is operating near point 2., for example, in normal cruise flight, and another method should be employed when operating near points 4 and 6. An aircraft must operate near these points during approach and landing so that another method is especially useful during these modes of operation.

Another method for controlling an aircraft during low speed flight is by pitch changes to control the angle of attack and thrust changes to control the flight path angle. The angle of attack is defined as the angle between the chord of the wing and the direction of motion of the aircraft. It is well known from aerodynamic theory that a given aircraft will always stall and develop its maximum angle of climb, maximum range and maximum endurance at the same angle of attack independent of gross weight or angle of bank. Furthermore, airspeed is a direct function of an aircraft's angle of attack at a given gross weight.

The present invention is an aircraft control system which employs a unique combination of thrust control information and angle of attack control information to yield an improved control system. This system was developed primarily for approach, and in this mode, an aircraft's angle of attack or airspeed is controlled entirely by pitch corrections and an aircraft's position on a glide path is controlled entirely by thrust level changes. However, this system has advantages in all areas of flight except cruise flight over the prior art systems.

Figure 4:
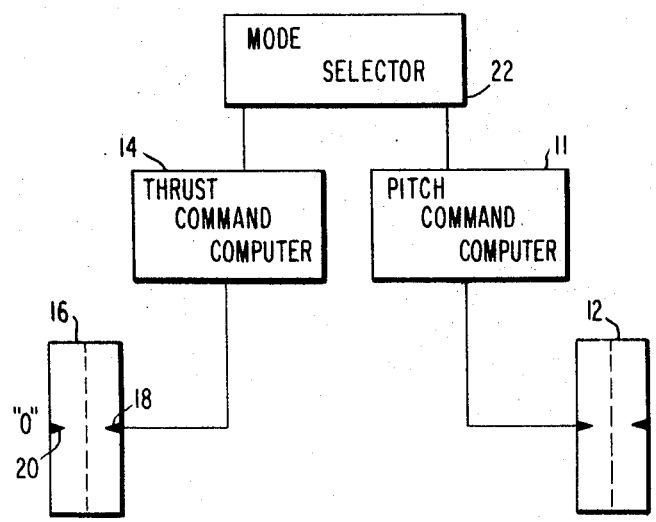
FIG. 4 is a block diagram of the basic implementation of the invention.

A basic block diagram implementation of the invention is shown in FIG. 4. A pitch command computer 11 calculates the direction and rate of pitch change required to maintain a desired angle of attack and produces a pitch command signal which is displayed for the pilot for manual operation on the pitch command display 12 or alternatively is used to control an autopilot during automatic operation. A thrust command computer 14 calculates the direction and rate of vertical displacement of the aircraft from the desired glide path to determine the direction and relative magnitude of a thrust correction required to zero the rate of departure from the glide path and produce a programmed rate of return to the glide path that is predetermined and variable according to the amount of linear displacement from the glide path. The thrust command signal can alternatively be used to control an autothrottle. The mode selector 22 is varied by the pilot depending upon the desired operation of the aircraft and determines the desired programmed angle of attack for the particular flight mode.

The pitch command computer compares the aircraft's actual angle of attack to the programmed angle of attack to determine the difference, then processes this difference simultaneously through a shaping network to determine the desired rate of return to the programmed angle of attack and through a differentiator circuit to determine the actual rate of change of the variation. These two signals are then compared in a summing network where the actual rate of change is subtracted from the desired rate of return to yield a signal which can be used to correct the actual rate of change to the desired rate of change. This signal is supplied to the pitch command display and/or alternatively to the autopilot for control of the aircraft. When the actual angle of attack is at the programmed value, the pitch command display will be zeroed. Any rate of change of the angle of attack will immediately be sensed and the indicator will show the direction in which to change the pitch in order to zero this rate. In addition, any departure from the desired angle of attack will result in a programmed rate of return to the desired value and the pitch command indicator will show the direction in which to change the pitch to achieve the desired rate of return. By changing the pitch in the direction shown on the pitch command indicator to keep the indicator at zero, the angle of attack will be precisely controlled at the desired value.

The thrust command computer 14 determines the vertical linear displacement of the aircraft from the desired glide path, and simultaneously processes the displacement through a shaping network to determine the desired rate of return to the glide path, dependent upon the amount of displacement, and through a differential circuit to determine the rate of change of the displacement. These two signals are then compared in a summing network where the actual rate of change is subtracted from the desired rate of return to determine the difference between the two which yields a signal that can be used to correct the actual rate of change to the desired rate of change. This signal is supplied to the thrust command indicator and/or alternatively to the autothrottle to cause changes in the thrust level so that the aircraft maintains a desired glide path. When the thrust is set at the desired level, the thrust command display will be zeroed. A rate of divergence from the glide path will be instantly recognized and a signal will be displayed on the thrust command indicator. Changing the thrust so that the aircraft's departure from the glide path ceases will tend to cancel the thrust command signal, except that any given displacement from the glide path will result in a signal to change the thrust an additional amount such that the aircraft will return to the glide path at a predetermined variable rate. That is, if the aircraft's linear displacement is large, the rate of return required to zero the thrust command needle might be on the order of 400 feet-per-minute while if the displacement is small a rate of return of only 40 feet-per-minute might be sufficient. The required rate of return thus varies and diminishes as the aircraft approaches the glide path. This should result in a very smooth and almost perfect control of flight path position.

FIG. 5 is a block diagram implementation of a preferred embodiment of the pitch command computer. The pitch command computer accepts, as inputs, the flight path angle $\gamma$, and the pitch $p$ of the aircraft. The flight path angle is computed as the angle whose sine is the vertical velocity rate divided by the airspeed. Airspeed is sensed from a conventional sensor and averaged over short periods by integration circuits to stabilize the output signal against wind gust fluctuations. The vertical velocity rate is determined by an inertial-lead vertical speed indicator. The pitch signal can be determined from a gyro horizon or a system comprised of a longitudinal accelerometer and airspeed sensor or any other form of inertial system. This method of sensing these variables has the advantage of taking the measurements directly from the aircraft's flight performance and, thus, the actual angle of attack can be determined. The summing network 30 accepts these indications of the flight path angle $\gamma$ and the pitch $p$ of the aircraft and then determines the actual angle of attack $\gamma a$ of the aircraft by performing the summing operation as indicated. The summing network 32 then 0270 the difference $\gamma'$ between the actual angle of attack $\gamma a$ and the desired angle of attack $\gamma d$.

The shaping network 34 accepts the output of the summing network 32 and determines the rate at which the difference $\gamma'$ between the actual angle of attack and the desired angle of attack should be corrected. This rate of correction is predetermined but is proportionately larger for larger variations.

The differentiator 36 also receives the output $\gamma'$ from summing network 32 and differentiates the difference $\gamma'$ between the actual angle of attack and the desired angle of attach to produce a signal proportional to the rate of change of this variation. The difference between the outputs of the shaping network 34 and the differentiator 36 is then calculated by the summing network 38 to produce a signal that represents the difference between the desired rate of return and the actual rate of return. This signal is displayed by a needle 41 on the pitch command display 40.

When the actual angle of attack is at the desired value, the pitch command indicator 41 will be at the zero center mark 39. Any rate of change of the angle of attack will be sensed immediately, and the indicator 40 will show the direction in which to change the pitch in order to zero the rate.

Furthermore, departure from the desired angle of attack will result in a corrective rate of return to the desired angle of attack. For example, if the angle of attack has increased to some value greater than that desired, then its rate of change is in the positive direction, and the indicator will show a negative value indicating a negative pitch correction is required. As soon as the actual rate of change of the angle of attack reverses and becomes equal to the desired rate of return, the needle 41 will center opposite the zero mark 39. Then, as the desired angle of attack is approached, the indicator needle 41 will gradually raise because of the lesser amount of correction called for by the shaping network 34. By making the appropriate pitch corrections, the pilot can keep the needle 41 zeroed and cause a perfect return to the desired angle of attack.

FIG. 6 is a block diagram of the preferred embodiment of the thrust command computer. The angle $\Omega$ between ground level and the desired position of the aircraft on a glide path and the angular difference $\Delta\Omega$ between this angle and the angle between the actual position of the aircraft and ground level are conventionally determined and used as inputs to a summing network 42 which calculates the angle $\Omega'$ between the actual position of the aircraft and ground level.

The altitude $h$ of the aircraft above the runway is determined by subtracting the field elevation from the aircraft's actual altitude above mean sea level. This altitude $h$ with the output from the summing network 42 provides the inputs to a dividing network 44. The actual distance S of the aircraft from the landing field is calculated by the dividing network 44 which divides $h$ by $\sin\Omega'$. A multiplier 46 calculates the linear displacement $h'$ of the aircraft from the desired glide path since, for small angles: $\sin\Delta\Omega = \Delta\Omega$. The rate of return $dh/dt$ to correct for this linear displacement $h'$ is determined by shaping network 48. The rate of the correction is predetermined but is proportionately larger for a larger linear displacement. The linear displacement $h'$ is also differentiated by the differentiating network 50 to determine the actual rate of displacement of the aircraft from the desired glide path.

The outputs of the shaping network 48 and the differentiator 50 are applied as inputs to a summing network 52 which produces an output signal $\epsilon$ which is proportional to the difference between these input signals. This output signal is displayed by a thrust command display 54. Adding or subtracting thrust to zero indicator 55 results in a smooth flight and a return to the glide path. By employing this method, a rate of displacement from the glide path is immediately indicated and a signal is displayed on the thrust command display for corrective action. In addition, the aircraft will return to the glide path from any displaced position at the desired rate by merely keeping the thrust command indicator 55 zeroed.

Although this control system was primarily developed for approach operations, it has advantages in other modes of operation as well. The mode selector 22 has an override mode which allows manual selection of the desired angle of attack by means of an angle of attack selector. When the mode selector is not in the override mode the angle of attack selector is driven by a servomotor to indicate the actual angle of attack. The signal to the servomotor comes from the actual angle of attack summing network 30 of the pitch command computer. This feature allows the selection of override mode at any time with assurance that the selector will be set for the actual angle of attack at the time of the selection, and also allows visual reference to actual angle of attack in other modes.

This takeoff mode can be further modified by a timer which provides a greater angle of attack for the initial portion of takeoff. This is advantageous because of the obstacle clearance requirements pertaining to runway length, necessitating an initial climb speed which is less than the best angle of climb speed for jet aircraft. The timer will automatically shift the angle of attack programmer to the value for best angle of climb at the end of the timed interval. Propeller driven aircraft will not need this feature since their initial climb speed is essentially their best angle of climb speed. This system has the advantage of providing precise control of the aircraft's angle of attack during the highly critical initial takeoff portion of flight.

The pilot may manually select climb mode when he desires the angle of attack programmer to shift to the value for best rate of climb. This offers the pilot the versatility of selecting the proper angle of attack programming for the specific flight condition.

Transitions from one programmed angle of attack to another will occur at a rate conforming to that generated by the shaping network for the desired rate of return from a displaced angle of attack to the programmed angle of attack.

When the pilot desires to level off in cruise flight he will select cruise mode. There is no programmed angle of attack for this mode and autopilot and manual operation will be exactly as in prior art systems.

Engaging the autopilot in cruise, hold or max range modes results in autopilot operation known as altitude hold. Pitch corrections required to maintain altitude will be computed by the autopilot.

In the hold mode the desired angle of attack for holding or maximum endurance flight is programmed. Since the autopilot does not get pitch command signals from the pitch command computer when in this mode, the display is for advisory information which will allow the pilot to adjust thrust until the autopilot performance approximates the pitch command display.

The max range mode operates exactly the same as the hold mode except for the different programmed angle of attack. These two modes offer the advantage of autopilot control of altitude during holding or maximum range operation with angle of attack advisory information to enable the pilot to adjust the thrust to the best level for the optimum performance.

Override mode is used for all descents and operations when it is desired to manually set the programmed angle of attack. This mode is extremely useful and allows climbs and descents in any condition while maintaining a desired angle of attack. It also allows manual selection of a different programmed angle of attack for other operation.

The severe turbulence mode programs an angle of attack suitable for operation in severe turbulence which will prevent structural damage to the aircraft. Thrust is necessarily changed to assist in cancelling effects of high vertical velocity rates.

The approach mode programs the proper angle of attack for approach. This mode also energizes the thrust command computer. No automatic feature to shift the angle of attack programmer to takeoff mode for a go-around is required since the two desired angles of attack are very nearly the same and both have compensation for flap position. Advancement of thrust for a go-around will cause a large change in the flight path angle and the pitch command computer will provide an immediate pitchup command signal to bring the angle of attach back into balance with the desired angle of attack. This mode of operation has the advantages of correctly controlling the primary effects of pitch and thrust by pitch and thrust corrections, respectively. The system will give the correct commands for the most adverse conditions and will operate correctly near the signal source and during wind shear. This system is easily usable for all approaches with or without a glide path signal. When a glide path signal is not present the thrust command computer will not operate. Angle of attack is precisely controlled by pitch corrections to keep the pitch command needle zeroed and thrust will be varied to give a desired rate of descent with reference to the descent rate instrument on the pilot's instrument panel.

While the invention has been particularly shown and described with reference to a preferred embodiment thereof, it will be understood by those skilled in the art that various changes in form and details may be made therein without departing from the spirit and scope of the invention.

I claim:

1. The method of controlling an aircraft in an approach mode with respect to maintaining a desired glide path and airspeed comprising the steps of:
   a. correcting for vertical displacements from the glide path by controlling the thrust level of the aircraft to vary the flight path angle of the aircraft,
   b. simultaneously controlling the pitch of the aircraft to maintain a desired angle of attack, said correcting step further comprising:
   c. determining the rate of which said aircraft is being displaced from said glide path and controlling the thrust level to reduce this rate to zero, and
   d. determining the linear displacement of said aircraft from said glide path and controlling the thrust level to return the aircraft to the glide path.

2. The method of claim 1 wherein said step for controlling the pitch of said aircraft comprises:

a. determining the rate at which the angle of attack of said aircraft is being displaced from said desired angle of attack and controlling the pitch of said aircraft to reduce this rate to zero, and
   b. determining the angular displacement of said aircraft from said desired angle of attack and controlling the pitch to return the angle of attack to the desired angle of attack.

3. The method of claim 2 further comprising:
   a. determining a desired rate of return to the desired angle of attack as a predetermined variable function of said angular displacement, and
   b. controlling the pitch to return the aircraft to said desired angle of attack at said desired rate.

4. The method of claim 1, wherein the magnitude of the thrust level control varies in a predetermined, but variable, manner relative to the magnitude of the aircraft's vertical displacement from the glide path in order to produce a smooth return to a desired glide path.

5. The method of claim 1 wherein the magnitude of the pitch control varies in a predetermined, but variable, manner relative to the magnitude of the difference between the aircraft's actual angle of attack and its desired angle of attack in order to produce a smooth controllable return to a desired angle of attack without producing overcorrections or oscillations.

6. The method of claim 1 wherein the magnitude of the thrust level control varies in a predetermined, but variable, manner relative to the magnitude of the difference between the actual rate of return to said glide path and the desired rate of return to said glide path in order to produce a smooth return to said glide path.

7. The method of claim 1 wherein the magnitude of the pitch control varies in a predetermined, but variable, manner relative to the magnitude of the difference between the aircraft's actual rate of change of the angle of attack and the desired rate of change of the angle of attack in order to produce a smooth controllable return to said desired angle of attack without producing overcorrections or oscillations.

8. The method of claim 1 wherein said correcting step further comprises:
   a. determining a desired rate of return to said glide path as a function of said linear displacement, and
   b. controlling the thrust level to return the aircraft to said glide path at said desired rate.

9. An aircraft control system for automatically maintaining a desired glide path and a desired angle of attack during the approach mode of the aircraft, and having means to control the pitch level of said aircraft, wherein, said means for controlling said pitch level comprises:
   a. computing means for determining the angular displacement of said aircraft from said desired angle of attack, and
   b. computing means for determining the rate at which said aircraft is being angularly displaced from said desired angle of attack, whereby, said aircraft's angular rate of displacement from said desired angle of attack is first reduced to zero and said aircraft's angular displacement from said desired angle of attack is secondly reduced to zero.

10. An aircraft control system for maintaining a desired glide path and airspeed during the approach mode of the aircraft, and having means to control the thrust level of said aircraft, wherein said means for controlling said thrust level comprises:
   a. computing means for determining the linear displacement of said aircraft from said glide path, and
   b. computing means for determining the rate at which said aircraft is being displaced from said glide path, whereby said aircraft's rate of displacement from said glide path is first reduced to zero and said aircraft's linear displacement from said glide path is then reduced to zero.

11. In an aircraft control system the method of producing a correction signal for correcting a displacement of an aircraft to a desired value comprising the steps of:
   a. determining the magnitude of the displacement of the aircraft from the desired value;
   b. determining the desired rate of return to said desired value in proportion to the magnitude of said displacement;
   c. determining the actual rate of return to said desired value; and
   d. determining the difference between said desired rate of return and said actual rate of return to produce a correction signal proportional to said difference.

12. The method as defined in claim 11 wherein said desired value is a desired angle of attack of said aircraft during an approach mode, and said displacement is the angular displacement of said aircraft from said desired angle of attack.

13. The method as defined in claim 11 wherein said desired value is a desired glide path of said aircraft during an approach mode, and said displacement is the linear displacement of said aircraft from said desired glide path.

14. An aircraft control system for producing a correction signal for correcting a displacement of an aircraft to a desired value comprising:
   a. means for determining the magnitude of the displacement of the aircraft from the desired value;
   b. means for determining the desired rate of return to said desired value in proportion to the magnitude of said displacement;
   c. means for determining the actual rate of return to said desired value,
   d. means for determining the difference between said desired rate of return and said actual rate of return to produce a correction signal proportional to said difference and means responsive to said correction signal to control said aircraft.